Sept. 27, 1932.  F. G. HENRY  1,879,232
CONVEYER BELT SUPPORT
Filed Oct. 10, 1931

INVENTOR.
Ferdinand G. Henry
BY Lancaster, Allwine & Rommel
ATTORNEYS.

Patented Sept. 27, 1932

1,879,232

UNITED STATES PATENT OFFICE

FERDINAND G. HENRY, OF MOLINE, ILLINOIS

CONVEYER BELT SUPPORT

Application filed October 10, 1931. Serial No. 568,157.

The present invention relates to supports for troughed conveyer belts and the primary object of the invention is to provide a troughed conveyer belt support wherein the belt is retained in a central position upon the pulleys or rollers without the aid of guide rollers or other centering devices for the belt.

A further object of the invention is to provide a support for belt conveyers having pulleys of such formation as to automatically retain the belt centrally located without requiring pivotal mounting of the support for the pulleys.

A further object of the invention is to provide a conveyer belt support embodying but two rollers or pulleys of such formation and so related as to prevent lateral movement of the belt, the belt being retained in a central position thru a crowning effect produced by the shape and relation of the two rollers.

A further object of the invention is to provide a troughed conveyer belt support of the two pulley type wherein the belt is retained centrally of the pulleys solely by the formation of the pulleys.

Other objects and advantages of the invention will be apparent during the course of the following detailed description, taken in connection with the accompanying drawing forming a part of this specification and in which drawing.

Figure 1:
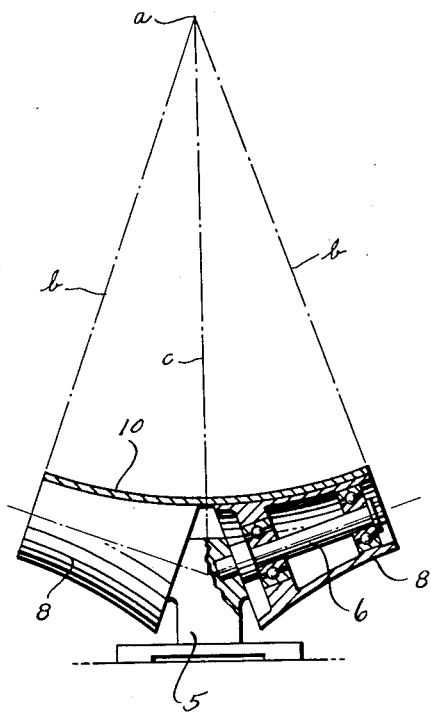
Figure 1 is a side view of one of the improved belt supports showing one of the pulleys in section and a belt supported upon the pulleys.

Referring to the drawing in detail and wherein similar reference characters designate corresponding parts thruout the several views, the conveyer belt support shown in Figure 1 comprises a supporting stand or base 5 having mounted thereon in obtuse angular relation to one another a pair of pulley supporting shafts, one of which is shown at 6. Rotatably mounted upon each shaft 6 is a belt pulley or roller 8 and these pulleys 8 as will be observed rotate about their axes at an angle with respect to the horizontal plane with their inner edges slightly spaced apart above the vertical axis of the stand 5.

The pulleys 8 are of like formation having similarly curved faces and are mounted in opposed or reverse relation with their major diameters adjacent the stand 5. The pulleys 8 as will be observed are arranged with their major diameters toward the center of the support and gradually decrease in diameter to the outer ends of the pulleys. The similarly curved faces of the pulleys 8 correspond to a common arc described by a radius from the point "$a$" forming the intersection of lines "$b$" normal to the arc and passing thru and parallel to the diametrical plane of the minor diameters of the pulleys. With this arrangement, there will be an even decrease in diamenter in the pulleys from the center line "$c$" outwardly toward the end of each pulley. Thus, the minimum diameter is at the extreme outer end of each pulley, while the maximum diameters of the pulleys are at the center of the support.

The pulleys 8 are adapted to support a belt 10 having a width no greater than a line following the arc between the radial lines "$b$" which are normal to the arc and pass thru the minor diameters of the pulleys.

The difference in the two diameters of each pulley 8, and the reverse or opposed relation of the pulleys, produces a crowning effect thus causing the conveyer belt 10 to always remain in a central position upon the support. As the belt 10 is moved over the pulleys 8, causing the same to revolve, the gradually increasing diameters of each pulley toward the center line "$c$" will cause the belt to be moved laterally in one direction by one of the rollers and laterally in an opposite direction by the opposite roller with an even force, thus retaining the belt in a central positoin.

The guiding of the belt on the pulleys is automatically produced by the difference in peripheral velocity of the surface of each pulley due to their constantly increasing diameter toward the center of the belt and the reverse or opposed relation of the pulleys producing a crowning effect. This crowning effect producing the peripheral velocity at the center of the support, causes the belt to normally remain in a central position and if disturbed, to immediately return to a central position upon removal of the disturbing force. Thus the support provides a support for troughed conveyer belts of the two pulleys in line type having a self-centering feature for automatically retaining the belt centered.

Figure 2:
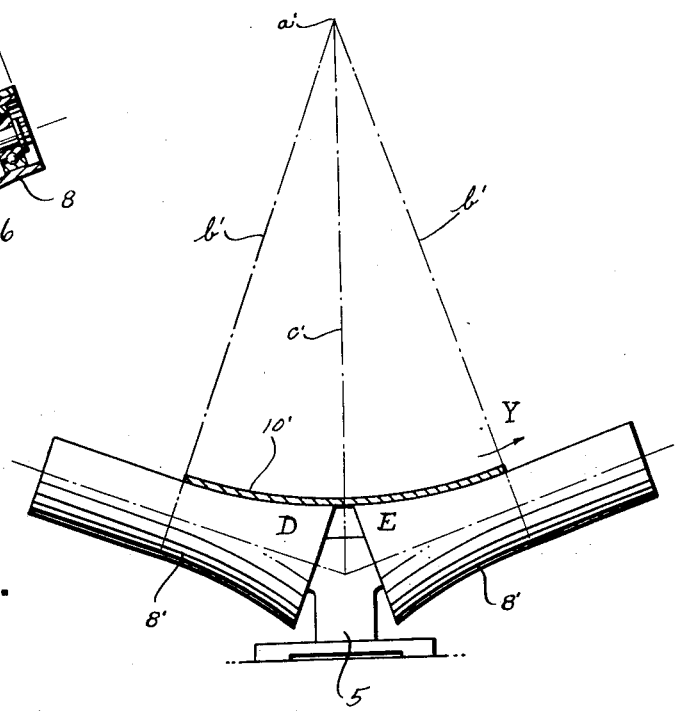
Figure 2 is a side elevation of a slightly modified form of belt support embodying the principles of my invention.

Referring to Figure 2, the pulleys or rollers 8' are mounted upon a stand or base 5 in a manner similar to the mounting of the rollers 8 as shown in Figure 1. These pulleys 8' are of like formation and each is formed at its inner end portion with similarly curved faces corresponding to a common arc described by a radius from the point "a'" forming the intersection of lines "b'" normal to the arc and passing thru and parallel to the minor diameters of the curved portions of the pulleys. From the minor diameters of the inner curved portions of the pulleys 8', the pulleys are of uniform diameter. That is, there is no increase or decrease in diameter of the pulleys beyond the radial lines "b'". While the belt 10' has been shown of a width to rest solely upon the curved portions of the pulleys, if so desired the belt may be of a width so that the side portions thereof will run upon the straight surfaces of the pulleys. With the arrangement in Figure 2, a single crown effect is formed at the center of the support as in Figure 1 with the advantage that a slightly wider belt may be used upon the form of pulleys shown in Figure 2. The centering action of the belt 10' upon the pulleys 8' will be similar to the centering action of the pulleys 8 upon the belt 10.

It will be noted in each form of support as shown in Figures 1 and 2, that each pulley is formed with one major diameter and one minor diameter connected by curved surfaces, with the major diameters of the pulleys adjacent one another.

Figure 3:
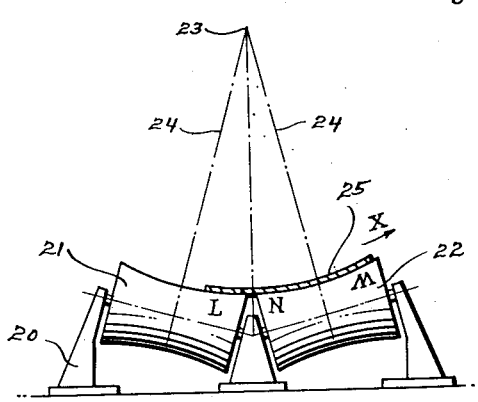
Figure 3 is a view of a troughed belt support of the two pulley type such as disclosed in Patent #728,005 of May 12, 1903 and shown to illustrate by contrast, characteristics of my improved troughed conveyer belt support.

Referring now to Figure 3, shown to illustrate, by contrast, characteristics of my improved conveyer belt support over prior types of troughed belt supports of the two pulley in line type, this support includes a base or stand 20 upon which is mounted two pulleys 21 and 22 of identical formation. These pulleys 21 and 22 have similarly concaved faces and are mounted in angular relation with the curved faces corresponding to a common arc described by a radius from a point 23 which is the intersection of radial lines 24 normal to the arc and passing thru the minor diameters of the pulleys which thru the formation of the pulleys is arranged midway between the ends of the pulleys. This form of conveyer belt support may be termed "a double crown pulley". In Figure 3 the belt 25 has been shown in a position shifted over the pulley 22 and out of a center position upon the support.

The pulley support as shown in Figure 3 is incapable of self-centering the belt supported thereon. In a support of this type, the major diameters of each pulley are equal and the minor diameters of each pulley are equal so that when the belt shifts slightly, say in the direction of the arrow "X", the belt will be acted upon by two crown portions L and M acting to further shift the belt in the direction of the arrow "X", while opposed by only one crown portion N acting to return the belt to a center position. In other words, considering the centering effect of a crowned pulley, we have the force of the crown portions L and M acting in one direction as against N acting in the opposite direction. Therefore, when the belt is shifted from a central position, the two opposing forces of the pulleys acting in opposite directions across the belt will become unbalanced and further shift the belt to one side by the unevenly acting forces. The belt when once shifted will not be restored by the pulley action itself and must be restored to a central position by some external force applied to the edge of the belt. With these uneven forces acting upon the belt 25, the belt is moved in the direction of the arrow until it is centered over the pulley 22 and if a slight external force is then applied to the belt in the direction of the arrow "X", the belt will climb further upon the portion M and run along the outer edge of the pulley 22.

Referring again now to my self-centering conveyor belt support as disclosed in Figures 1 and 2, and particularly to Figure 2 merely for the purpose of explaining the principle of my invention, it will again be noted that the pulleys are arranged in a reverse relation with the larger diameters of the similarly curved face portions adjacent the center line "c'". Thus in effect, a single central crown is formed at the center of the pulleys providing crown portions D and E. These crown portions D and E provide two reverse faces which, as in a crowned pulley, act in opposite directions upon the belt toward the center of the pulleys to retain the belt in a central position thereon. This centralizing action is caused by the difference in peripheral velocities of the gradually increasing diameters of the portions D and E toward the center of the pulleys.

Thus, the belt is acted upon by two even forces tending to centralize the belt upon the pulleys and should the belt climb off center, in the direction of the arrow "Y", the equilibrium of the forces will be destroyed due to an increase in surface contact of the belt with the pulley having the crown portion E. The radial lines "b" pass thru the minor diameters of the pulleys, the straight portion of the pulley will have no effect upon the belt. The surface contact of the belt upon the pulley portion D has now been decreased while the surface contact of the belt upon the pulley portion E remains constant. This unequal surface contact of the belt upon the pulley portions D and E causes the belt to be returned to a central position due to the increased centralizing action of the portion E over that of the portion D. Thus the belt is centered without the aid of guide pulleys or other forces acting to center the belt on the pulleys. This automatic centralizing action of the support is due to the fact that there is no increase in diameter in either pulley from the center line of the support outwardly toward the ends of the pulleys with the minimum diameter of the pulleys at the extreme outer ends and the maximum diameters of the pulleys at the center of the support.

Thus it will be seen that an improved construction for troughing belt conveyer rolls of the two pulley in line type has been disclosed embodying pulleys of such formation and so related as to automatically retain the belt centrally supported upon the pulleys.

Changes in detail may be made to the form of invention herein disclosed, without departing from the spirit of the invention or the scope of the following claims.

I claim:

1. A support for conveyer belts comprising a pair of pulleys mounted for rotation in obtuse angular relation to one another, said pulleys being of maximum diameter at their inner ends and gradually decreasing in diameter to their outer ends providing curved supporting faces corresponding to a common arc.

2. A troughing belt conveyer roll comprising a stand, and a pair of pulleys each having a major and a minor diameter, rotatably mounted upon the stand in obtuse angular relation to one another upon the stand with their ends of minor diameter outermost, said pulleys having similarly curved supporting faces corresponding to a common arc described by a radius from a point forming the intersection of lines normal to the arc and passing thru the minor diameters of the pulleys.

3. A support for conveyer belts, comprising a stand, a pair of pulleys, each having a major and a minor diameter, rotatably mounted upon the stand in obtuse angular relation to one another with their ends of minor diameter outermost, said pulleys having similarly curved supporting faces corresponding to a common arc described by a radius from a point forming the intersection of lines normal to the arc and passing thru and parallel to the plane of the minor outer diameters of the pulleys and a belt supported on the pulleys and being of a width no greater than the length of the supporting face between the minor diameters of the pulleys.

4. A support for conveyer belts, comprising a pair of pulleys, each having a major and a minor diameter, rotatably mounted in obtuse angular relation to one another with their ends of minor diameter outermost, said pulleys having similarly curved faces corresponding to a common arc described by a radius from a point forming the intersection of lines normal to the arc and passing thru the minor diameters of the pulleys, and a belt supported on the pulleys and being of a width no greater than a line along the arc between the radial lines which are normal to the arc and pass thru the minor diameters of the pulleys.

5. In a troughed belt conveyer, a pair of pulleys rotatably mounted in obtuse angular relation to one another, said pulleys having crown portions at their inner ends having similarly curved faces corresponding to a common arc described by a radius from a point forming the intersection of lines normal to the arc and passing thru the pulleys at the outer ends of the crown portions, and extensions of uniform diameters extending from the outer end of each crown portion and being of no greater diameter than the minor diameters of the crown portions, and a belt supported on the pulleys and having a width no greater than the length of the supporting faces between the minor diameters of the crown portions.

FERDINAND G. HENRY.